US008239752B1

(12) United States Patent
Perelman et al.

(10) Patent No.: US 8,239,752 B1
(45) Date of Patent: Aug. 7, 2012

(54) METHOD AND SYSTEM TO FACILITATE WORKFLOW DATA SUBMISSION

(75) Inventors: Roberto Perelman, Sunnyvale, CA (US); Yuan Sheng Fu, Sunnyvale, CA (US); David Stromfeld, San Jose, CA (US); Rick Brown, San Jose, CA (US)

(73) Assignee: Adobe Systems Incorporated, San Jose, CA (US)

( * ) Notice: Subject to any disclaimer, the term of this patent is extended or adjusted under 35 U.S.C. 154(b) by 987 days.

(21) Appl. No.: 12/019,563

(22) Filed: Jan. 24, 2008

(51) Int. Cl.
*G06F 17/00* (2006.01)

(52) U.S. Cl. ........................................ 715/222; 715/229

(58) Field of Classification Search .................. 715/221, 715/222, 223, 224, 226, 229, 273, 744
See application file for complete search history.

(56) References Cited

U.S. PATENT DOCUMENTS

| | | | |
|---|---|---|---|
| 5,552,806 A | 9/1996 | Lenchik | |
| 5,600,780 A | 2/1997 | Hiraga et al. | |
| 5,838,315 A | 11/1998 | Craycroft et al. | |
| 5,907,326 A | 5/1999 | Atkin et al. | |
| 6,100,885 A | 8/2000 | Donnelly et al. | |
| 6,275,225 B1 | 8/2001 | Rangarajan et al. | |
| 6,342,907 B1 | 1/2002 | Petty et al. | |
| 6,507,833 B1* | 1/2003 | Hichwa et al. | 707/702 |
| 6,629,635 B1* | 10/2003 | Akamine | 235/375 |
| 7,007,231 B2* | 2/2006 | Dang | 715/213 |
| 7,278,168 B1 | 10/2007 | Chaudhury et al. | |
| 7,299,403 B1* | 11/2007 | Cleasby et al. | 715/738 |
| 7,613,696 B2* | 11/2009 | Morgan | 1/1 |
| 2002/0023053 A1* | 2/2002 | Szoc et al. | 705/39 |
| 2003/0177140 A1* | 9/2003 | Debard et al. | 707/104.1 |
| 2006/0036465 A1* | 2/2006 | O'Donnell | 705/1 |
| 2006/0195781 A1* | 8/2006 | Jatavallabha et al. | 715/506 |
| 2007/0118391 A1* | 5/2007 | Malaney et al. | 705/1 |
| 2007/0180380 A1* | 8/2007 | Khavari et al. | 715/704 |
| 2008/0072334 A1* | 3/2008 | Bailey et al. | 726/28 |
| 2008/0172239 A1* | 7/2008 | Henderson et al. | 705/1 |
| 2008/0307298 A1* | 12/2008 | Matveief et al. | 715/224 |
| 2010/0011280 A1* | 1/2010 | Cheeniyil et al. | 715/223 |
| 2010/0179962 A1* | 7/2010 | Schuster | 707/769 |

OTHER PUBLICATIONS

"Class Java.Util.Resource Bundle: Public Abstract Class Resource Bundle Extends Object", [Online]. Retrieved from the Internet: <URL:mk:@msitstore:c:\program%20file\microsoft%20Visual%.../java.util.resourcebundle.htm>, (Nov. 8, 1999), 3 pgs.

Applecare Knowledge Base Archive, "Mac OS 8: Appearance Information", [Online]. Retrieved from the Internet: <URL:http://docs.info.apple.com/article.html?artnum=24453>, (May 14, 1999), 2 pgs.

Microsoft Windows 2000, "Internet Information Services Features", [Online]. Retrieved from the internet: <URL:http://www.microsoft.com/windows2000//server/evaluation/features/web.asp>, (Apr. 19, 1999), 8 pgs.

Sanna, Paul, et al., "Using Windows NT Workstation 4.0: Second Edition", *Que Corporation*, (1997), 442-444.

\* cited by examiner

*Primary Examiner* — Laurie Ries (74) *Attorney, Agent, or Firm* — Schwegman, Lundberg & Woesnner, P.A.

(57) ABSTRACT

A method and system to facilitate workflow data submission is provided. The system may include a communications module to receive a request to generate an electronic form such that the electronic form is suitable for viewing with a first version of a viewer application and a compatibility module to respond to the request by configuring the electronic form to include a functional feature, the functional feature being available with the first version of the viewer application and being not available with a second version of the viewer application.

18 Claims, 6 Drawing Sheets

VIEWER version information 510
(version 2.0)

ELECTRONIC FORM 520

FORM FIELD 522

FORM FIELD 524

VIEWER version information 610
(version 3.0)

SUBMIT CONTROL 630

ELECTRONIC FORM 620

FORM FIELD 622

FORM FIELD 624

METHOD AND SYSTEM TO FACILITATE WORKFLOW DATA SUBMISSION

TECHNICAL FIELD

This application relates to a method and system to facilitate workflow data submission.

BACKGROUND

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

Some existing products offer a comprehensive architecture for electronic document creation, collaboration, and process management. In the context of such architecture, a user may initiate a workflow by distributing an electronic form to a group of participants and then be able to collect the filled out forms from the participants. The participants, in turn, may fill out the form and submit the filled-out form to the initiator of the workflow. In order to access and fill out an electronic form, a participant may utilize an authoring application or a viewing application, such as Adobe® Reader® software.

Over time, newer versions of authoring and viewing applications may include enhanced or supplemental features and capabilities. When a document created for use with a later version of a viewing application is opened, by a workflow participant, with an earlier version of the viewing application, the participant may be asked to upgrade the viewing application to the latest version in order to be able to contribute to the workflow.

BRIEF DESCRIPTION OF DRAWINGS

Embodiments are illustrated by way of example and not limitation in the figures of the accompanying drawings, in which like references indicate similar elements and in which.

DETAILED DESCRIPTION

A workflow of an electronic form may begin when an "initiator" (e.g., a person or an automated process) distributes an original electronic form (e.g., a blank electronic form) to workflow participants, e.g., people who need to fill out the form. It will be noted, that, for the purposes of this description, the terms "form" and "electronic form" may be used interchangeably. A participant, upon receiving the form, may open it using a viewer application (e.g., Adobe® Acrobat® or Adobe® Reader® software). A later version of an example viewer application may have a forms workflow capability that is not provided with earlier versions of the viewer application.

In one example embodiment, the forms workflow capability includes a "Submit" visual control presented by the viewer application. Supplying a "Submit" button for a distributed form inside the chrome of the viewer application may alleviate the need to author such control inside the electronic form such that as the author of an electronic form is spared the complication of having to understand the details of the underlying infrastructure needed for the distribution and return of the forms.

A method and system to facilitate workflow data submission may be utilized to create a so-called adaptive electronic form. An adaptive electronic form, in one example embodiment, may be configured to automatically adapt to the version of the viewer application used to open the form and, when lack of workflow capability in the viewer application is detected, provide an alternative way to complete the workflow. In one example embodiment, an authoring application, e.g., Adobe® Acrobat®, may be used to include intelligence, in the form of a JavaScript, into the electronic form to detect that the form is being opened with an older version of the viewer application, and respond by displaying a previously hidden visual control, referred to as an adaptive visual control, and activating the associated functionality. One example of an adaptive visual control that may be provided utilizing a method and system to facilitate workflow data submission is a "Submit" button. The visual control, in one embodiment, may be configured to provide equivalent functionality to what a recipient with a newer version would have experienced.

In one example embodiment, where functionality triggered by an adaptive visual control is achieved by different methods in an earlier and a later versions of the viewer application, an adaptive electronic form may be configured to choose a method that is appropriate to the version of the viewer application in response to a user activating the adaptive visual control. For example, in a scenario where submit functionality uses a server-based approach in a later version of the viewer application and relies on an email-based approach in an earlier version of the viewer application, the "Submit" button provided with the adaptive electronic form may be used to permit a workflow participant to complete the workflow and return the form to the initiator using an email-based approach. A method and system to facilitate workflow data submission may be implemented and utilized in the context of a network environment illustrated in FIG. 1.

Figure 1:
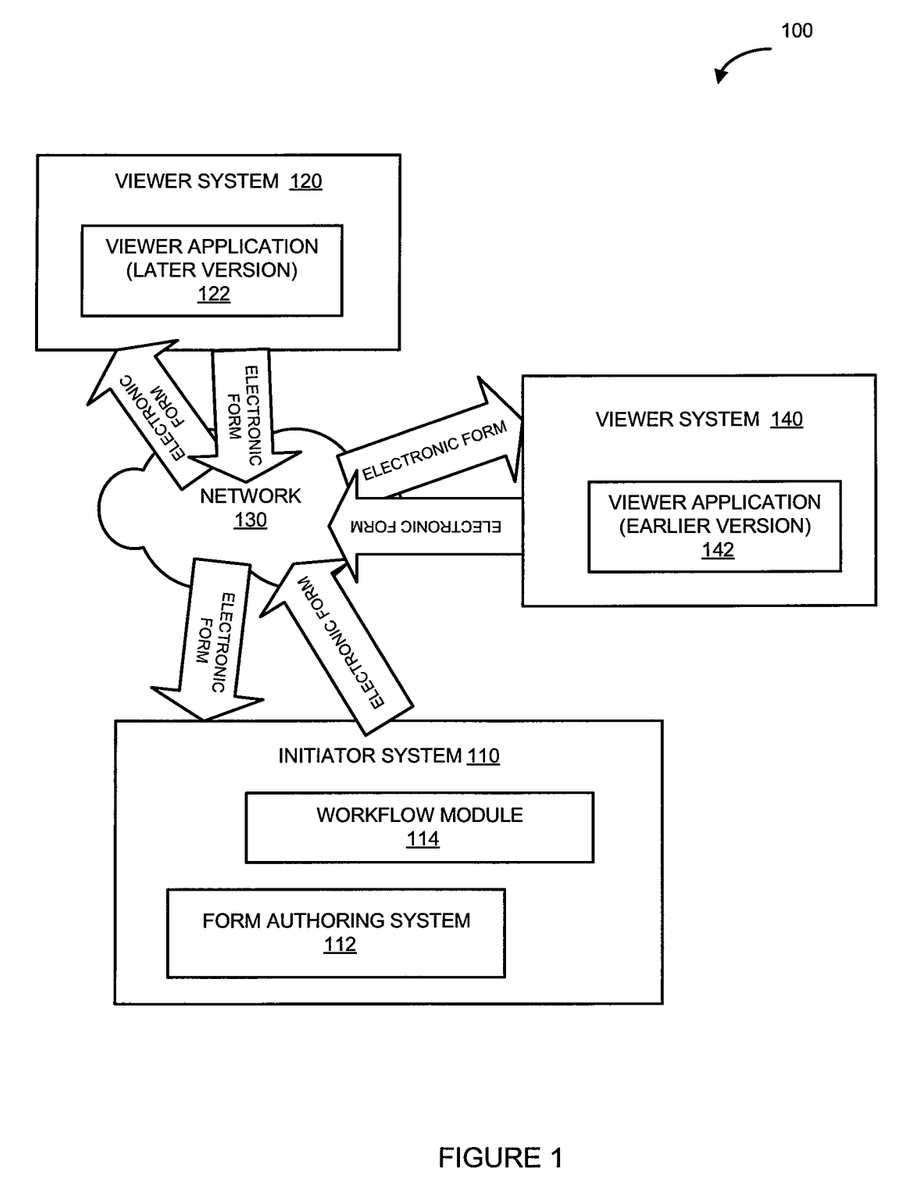
FIG. 1 shows a network environment, within which a method and system to facilitate workflow data submission may be implemented, in accordance with an example embodiment.

As shown in FIG. 1, the environment 100 includes an initiator system 110 communicating with viewer systems 120 and 140 via a communications network 130. The communications network 130 may be a public network (e.g., the Internet, a wireless network, a public switched telephone network (PSTN), etc.) or a private network (e.g., LAN, WAN, Intranet, etc.). The initiator system 110 may include a form authoring system 112 configured to permit creating electronic forms. In one embodiment an electronic form may incorporate complex functionality and may embody an application packaged as a form. The form authoring system 112 may be used, in one example embodiment, to create adaptive electronic forms.

A workflow module 114 may be configured to permit a user to initiate a form workflow, e.g., by automatically distributing an electronic form to participants. The form authoring system 112 and the workflow module 114, may be implemented as a form processing application, such as, for example, Adobe® Acrobat®. It will be noted, that the workflow module 114 and the form authoring system 112 may reside at the same computer system or may be distributed among different computer systems. Furthermore, the authoring stage may not always be followed by a workflow initiation, and the author of an electronic form does not have to be the same user as the initiator of the associated workflow.

The initiator system 110 may be used to distribute an adaptive electronic form to the viewer systems 120 and 140 associated with respective workflow participants and also to collect the filled out forms from participants. As shown in FIG. 1, viewer systems may host respective viewer applications, where the viewer system 120 hosts a later version 122 of the viewer application and the viewer system 140 hosts an earlier version 142 of the viewer application. In one example embodiment, an adaptive electronic form distributed via the workflow module 114 displays one or more adaptive visual controls (e.g., a "Submit" button) and hides any adaptive visual controls present in the form when opened with the later version 122 of the viewer application.

As mentioned above, the form authoring system 112 may be used to author adaptive electronic forms, which, in turn, facilitates workflow data submission. Adaptive electronic forms may be created, according to one embodiment, in a Portable Document Format (PDF). An example of such authoring system may be described with reference to FIG. 2.

Figure 2:
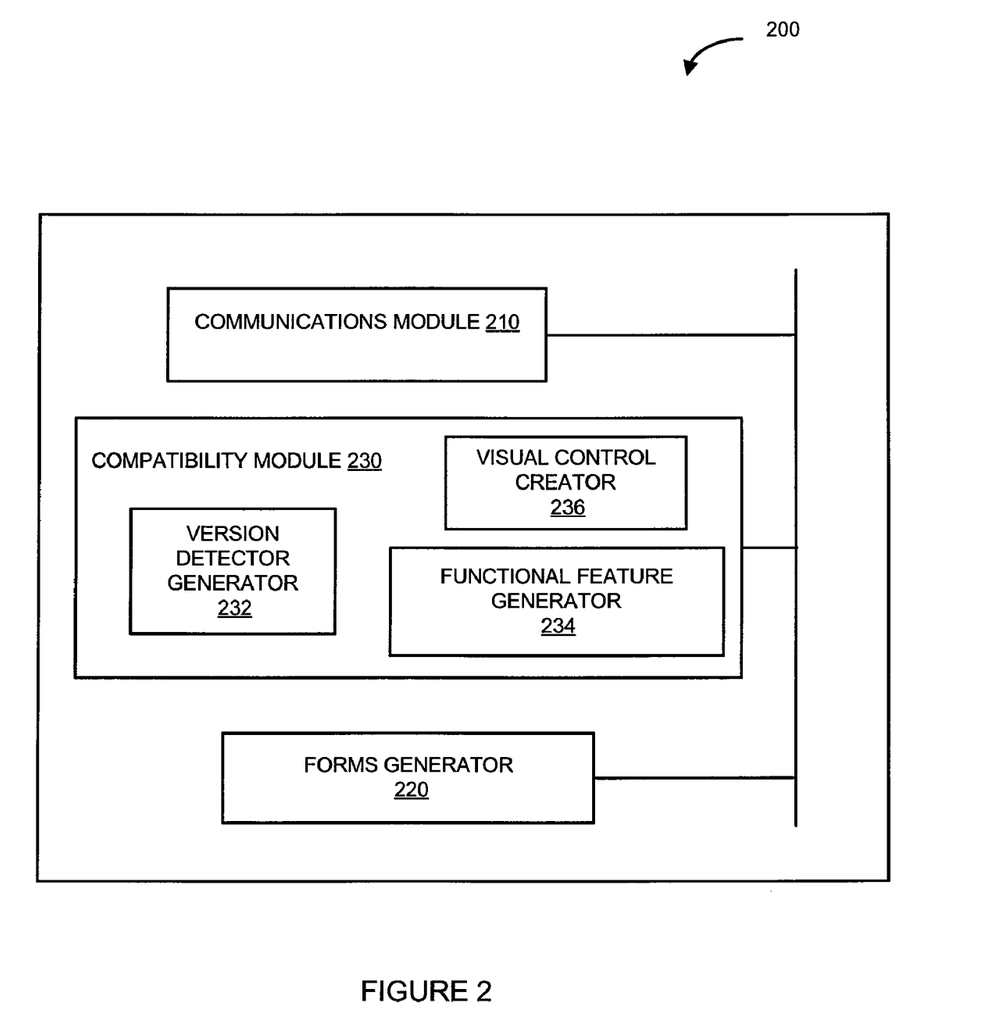
FIG. 2 is a block diagram illustrating a system to facilitate workflow data submission, in accordance with an example embodiment, to facilitate workflow data submission.

FIG. 2 is a block diagram illustrating a system 200 to facilitate workflow data submission, in accordance with an example embodiment. The system 200, in one example embodiment, includes a communications module 210, a forms generator 220, and a compatibility module 230. The communications module 210 may be configured to detect a request to generate an adaptive electronic form. The forms generator 220 may be configured to cooperate with the compatibility module 230 to generate adaptive electronic forms. It will be noted that the compatibility module 230, in some embodiments, may be incorporated into the forms generator 220.

The compatibility module 230, in one example embodiment, includes a version detector generator 232 to provide an adaptive electronic form with an ability to determine the version of a viewer application, a visual control creator to configure the form to include an adaptive visual control, and a functional feature generator to incorporate functionality associated with the visual control into the adaptive electronic form. Example operations performed by the system 200 may be described with reference to FIG. 3.

Figure 3:
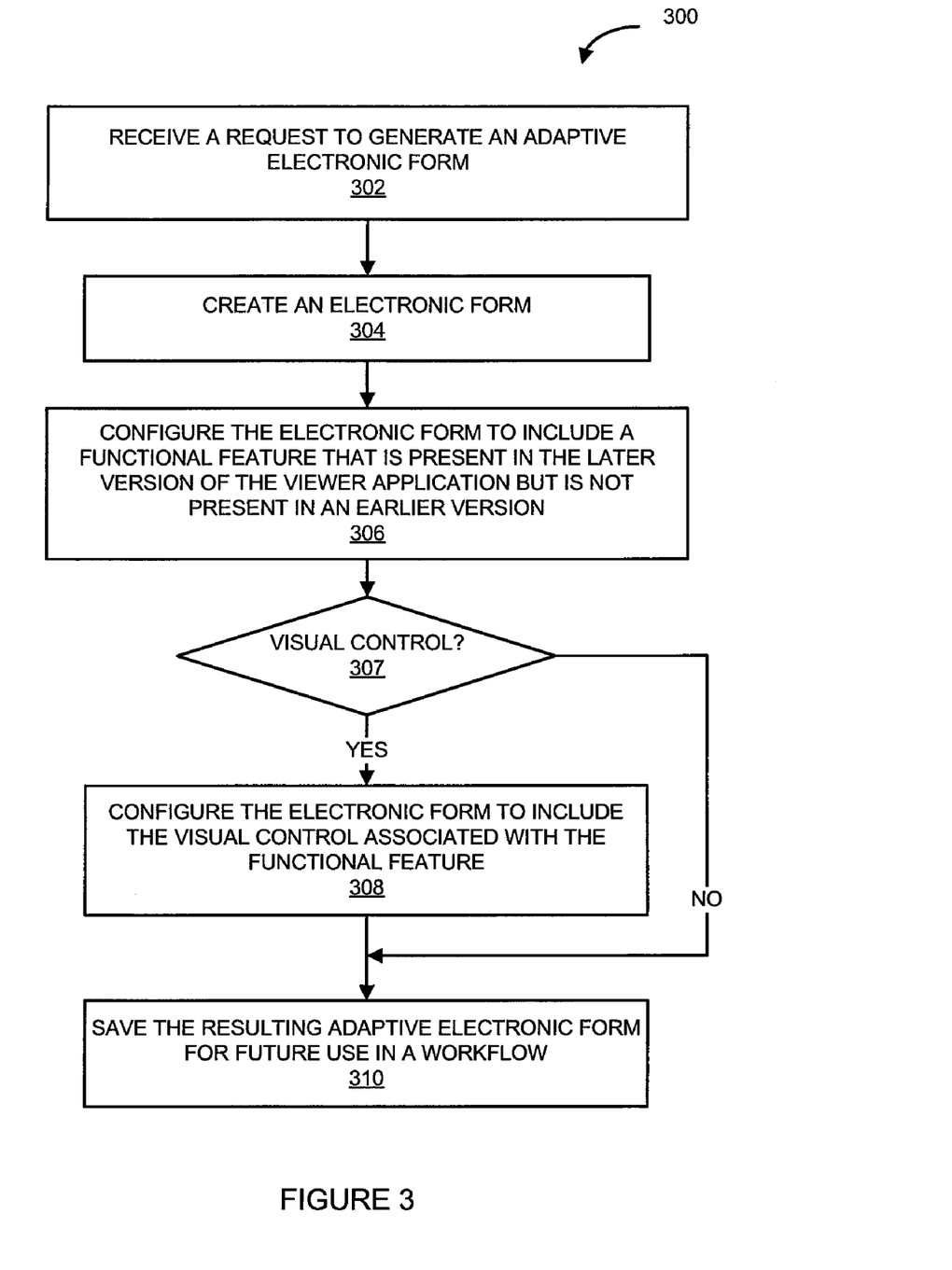
FIG. 3 is a flow chart illustrating a method to create an adaptive electronic form, in accordance with an example embodiment.

FIG. 3 is a flow chart illustrating a method 300 to create an adaptive electronic form, in accordance with an example embodiment. The method 300 may be performed by processing logic that may comprise hardware (e.g., dedicated logic, programmable logic, microcode, etc.), software (such as run on a general purpose computer system or a dedicated machine), or a combination of both. It will be noted, that, in an example embodiment, the processing logic may reside in any of the modules shown in FIG. 2 described above.

As shown in FIG. 3, the method 300 commences at operation 302. At operation 302, the communications module 210 of FIG. 2 receives a request to generate an adaptive electronic form. In response to the request, the forms generator 220 creates an electronic form at operation 304 and engages the compatibility module 230 in order to configure the electronic form with adaptive capabilities. At operation 306, the functional feature generator 234 configures the electronic form to include a functional feature that is present in the later version of a viewer application but is not present in earlier versions of the viewer application. If it is determined, at operation 307, that the functional feature is associated with a visual control (e.g., as in the case of workflow capability represented by a "Submit" button described above), the visual control creator 236 configures the electronic form to include the associated visual control. The associated visual control may be displayed in the electronic form when the form is opened with an earlier version of a viewer application and hidden when the form is opened with a later version of a viewer application, e.g., the version that already includes such control inside the chrome of the viewer application. The visual control that is being displayed or hidden based on the version of the viewer application may be termed an adaptive visual control.

If it is determined, at operation 307, that the functional feature is not associated with any visual controls, the method 300 proceeds to operation 310. At operation 310, the generated adaptive electronic form is saved for future use, e.g., for distributing as part of a workflow. An example method of using an adaptive electronic form may be described with reference to FIG. 4.

Figure 4:
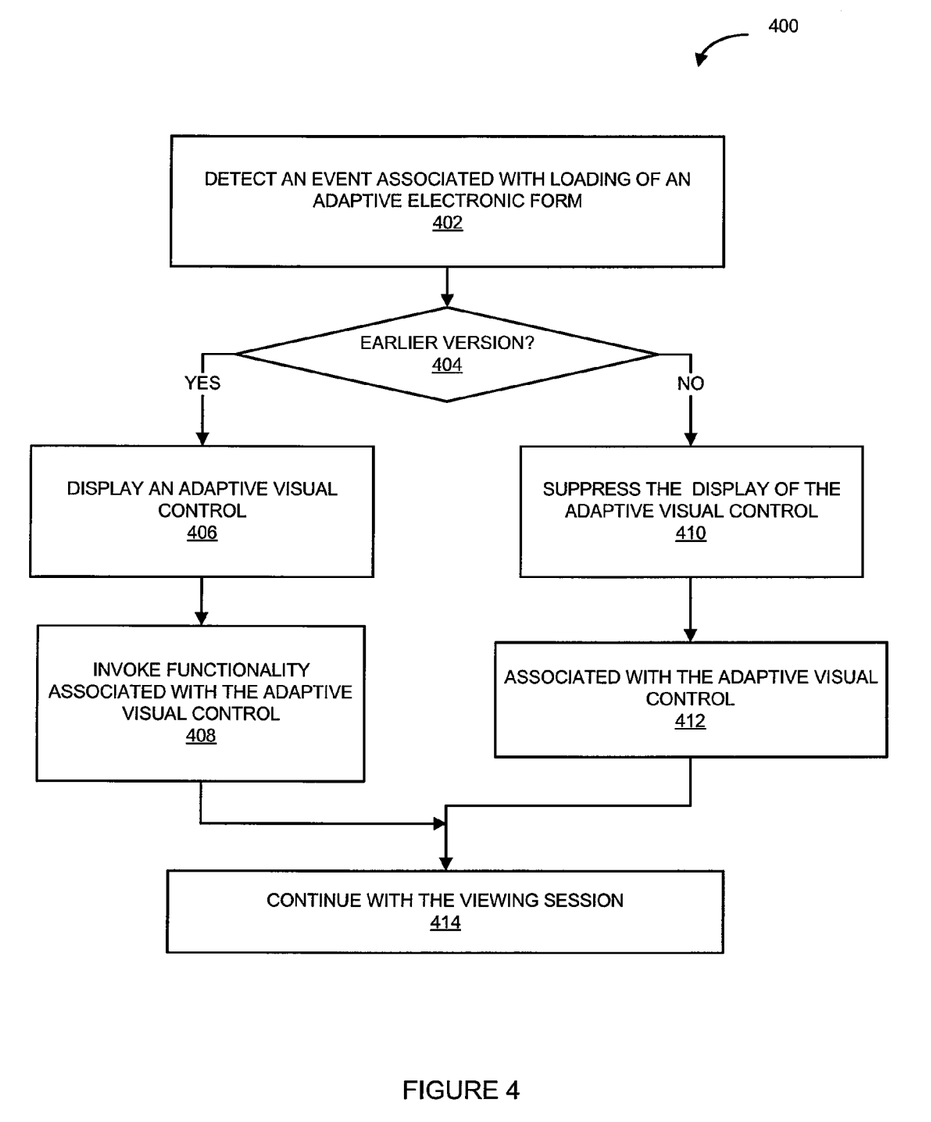
FIG. 4 is a flow chart illustrating a method of utilizing an adaptive electronic form, in accordance with an example embodiment.

FIG. 4 is a flow chart illustrating a method 400 of using an adaptive electronic form, in accordance with an example embodiment. The method 400 may be performed by processing logic that may comprise hardware (e.g., dedicated logic, programmable logic, microcode, etc.), software (such as run on a general purpose computer system or a dedicated machine), or a combination of both. It will be noted, that, in an example embodiment, the processing logic may reside in a viewer application and may be incorporated into an adaptive electronic form.

As shown in FIG. 4, the method 400 commences at operation 402. At operation 402, an event associated with loading of an electronic form is detected as a viewing session is initiated by a workflow participant. If, at operation 404, a version detector present in the electronic form determined that the viewer application is an earlier version of the viewer application, the adaptive electronic form displays an adaptive visual control at operation 406. As explained above, the adaptive visual control may be an visual control associated with functionality that is available with a later but not earlier version of the viewer application. At operation 408 the adaptive electronic form invokes functionality associated with the adaptive visual control.

If it is determined, at operation 404, that the viewer application is a later version of the viewer application, the adaptive electronic form suppresses the display of the adaptive visual control at operation 410 and suppresses the associated functionality at operation 412. The method 400 then proceeds to operation 414 to continue with the viewing session.

Figure 5:
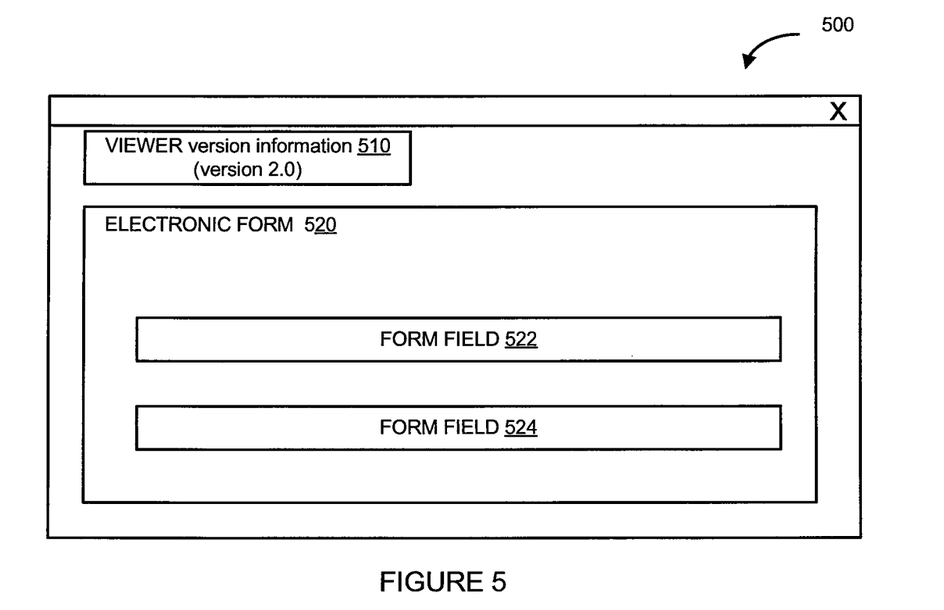
FIG. 5 illustrates a viewer application user interface presented by an adaptive electronic form when opened with an earlier version of a viewer application, in accordance with an example embodiment.

FIG. 5 illustrates an example viewer application user interface 500 that includes a presentation of an adaptive electronic form when the form is opened with an earlier version of the viewer application. As shown in FIG. 5, the user interface 500 includes a version information area 510 and an electronic form area 520. A form field 522 and a form field 524 are displayed within the electronic form area 520. The viewer application user interface 500, exclusive of the electronic form area 520, does not include a control to automatically submit electronic forms to a designated destination as part of a workflow. Instead, a submit control 530 is provided as part of the adaptive electronic form displayed in the electronic form area 520.

Figure 6:
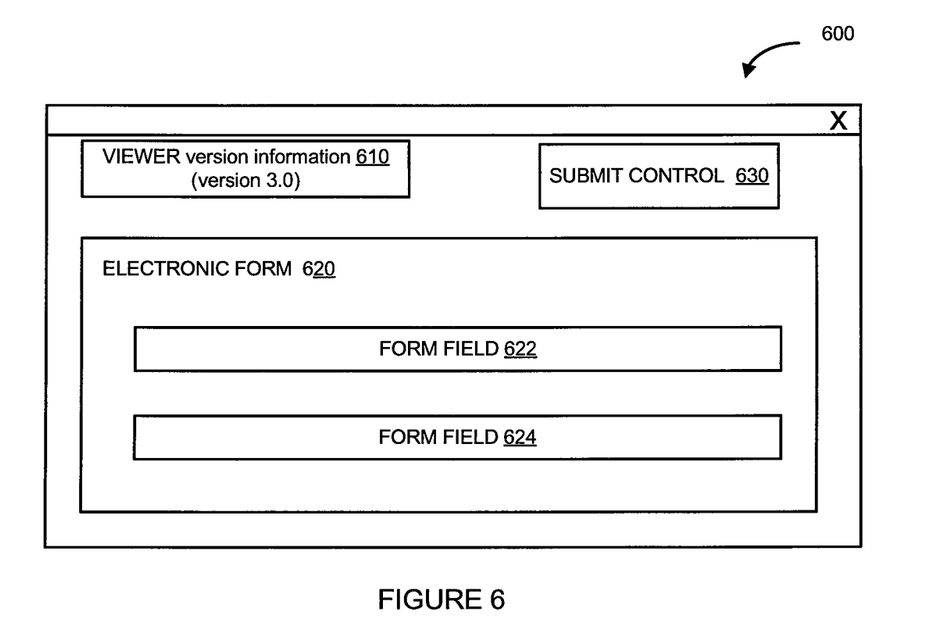
FIG. 6 illustrates a viewer application user interface presented by an adaptive electronic form when opened with a later version of the viewer application, in accordance with an example embodiment.

FIG. 6 illustrates an example viewer application user interface 600 that includes a presentation of an adaptive electronic form when the form is opened with a later version of the viewer application. As shown in FIG. 6, the user interface 600 includes a version information area 610, an electronic form area 620, and a submit control 630 presented as part of the viewer application. A form field 622 and a form field 624 are displayed within the electronic form area 620.

As shown in FIG. 6, the submit control 630 is presented within the user interface 600 as part of the viewer application and not in the electronic form area 620. Thus, while the adaptive electronic form displayed in the electronic form area 620 is configured with adaptive workflow capabilities, the display of a submit control within the form area 620 is suppressed, because the adaptive electronic form is opened with a later version of the viewer application that already includes the submit control 630 as part of the viewer application.

It will be noted that the techniques described herein may be utilized advantageously with a variety of applications related to providing electronic forms to users. Method and system to facilitate workflow data submission may be implemented in a variety of ways, utilizing a variety of equipment components and programmatic techniques. In one example embodiment, a machine-readable medium may be provided having instruction data to cause a machine to receive a request to generate an electronic form, the electronic form being suitable for viewing with a later version of a viewer application and to respond to the request by configuring the electronic form to include a functional feature that is with the later version of the viewer application and being not available with an earlier version of the viewer application.

A further machine-readable medium may be provided having instruction data to cause a machine to detect that an electronic form was opened with an earlier version of a viewer application, the earlier version of the viewer application lacking a functional feature associated with a later version of the viewer application; and activate the functional feature, the functional feature being included in the electronic form.

It will be noted that, while the techniques to configure an electronic form with an alternative UI functionality have been described with reference to an earlier and a later version of a viewer application, these techniques may be utilized advantageously to provide functionality that may not be available with any particular version of a viewer application. For example, an earlier version may include certain functionality and an associated visual control, while a later version may not have it. An electronic form may still be configured, utilizing the techniques described herein, to provide users with functionality that may not be available with every version of the viewer application.

Figure 7:
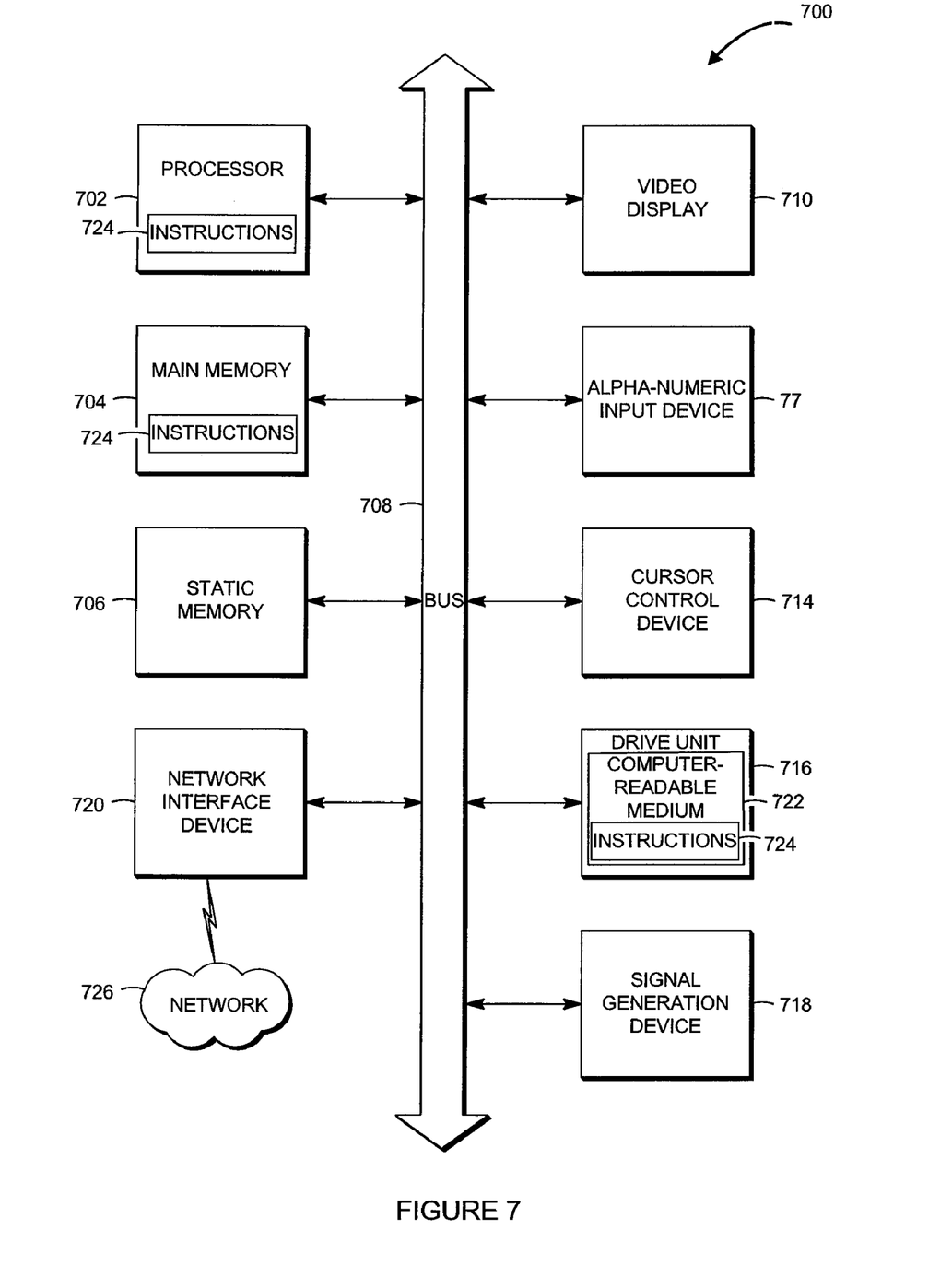
FIG. 7 illustrates a diagrammatic representation of a machine in the example form of a computer system within which a set of instructions, for causing the machine to perform any one or more of the methodologies discussed herein, may be executed.

FIG. 7 shows a diagrammatic representation of a machine in the example electronic form of a computer system 700 within which a set of instructions, for causing the machine to perform any one or more of the methodologies discussed herein, may be executed. In various embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a portable music player (e.g., a portable hard drive audio device such as an MP3 player), a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 700 includes a processor 702 (e.g., a central processing unit (CPU), a graphics processing unit (GPU) or both), a main memory 704 and a static memory 706, which communicate with each other via a bus 708. The computer system 700 may further include a video display unit 710 (e.g., a liquid crystal display (LCD) or a cathode ray tube (CRT)). The computer system 700 also includes an alphanumeric input device 712 (e.g., a keyboard), a user interface (UI) navigation device 714 (e.g., a mouse), a disk drive unit 716, a signal generation device 718 (e.g., a speaker) and a network interface device 720.

The disk drive unit 716 includes a machine-readable medium 722 on which is stored one or more sets of instructions and data structures (e.g., software 724) embodying or utilized by any one or more of the methodologies or functions described herein. The software 724 may also reside, completely or at least partially, within the main memory 704 and/or within the processor 702 during execution thereof by the computer system 700, the main memory 704 and the processor 702 also constituting machine-readable media.

The software 724 may further be transmitted or received over a network 726 via the network interface device 720 utilizing any one of a number of well-known transfer protocols (e.g., HTTP).

While the machine-readable medium 722 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention, or that is capable of storing, encoding or carrying data structures utilized by or associated with such a set of instructions. The term "machine-readable medium" shall accordingly be taken to include, but not be limited to, solid-state memories, optical and magnetic media, and carrier wave signals. Such medium may also include, without limitation, hard disks, floppy disks, flash memory cards, digital video disks, random access memory (RAMs), read only memory (ROMs), and the like.

The embodiments described herein may be implemented in an operating environment comprising software installed on a computer, in hardware, or in a combination of software and hardware.

Although embodiments have been described with reference to specific example embodiments, it will be evident that various modifications and changes may be made to these embodiments without departing from the broader spirit and scope of the invention. Accordingly, the specification and drawings are to be regarded in an illustrative rather than a restrictive sense.

The invention claimed is:

1. A system to generate adaptive electronic documents, the system comprising:
   a memory;
   at least one processor coupled to the memory;

a communications module to receive a request to generate an electronic form, the electronic form being suitable for viewing with a first version of a viewer application; and a compatibility module to respond to the request by configuring the electronic form, using the at least one processor, to include a functional feature, the functional feature to be activated in response to detecting that the electronic form is opened with the first version of the viewer application and to be suppressed in response to detecting that the electronic form is opened with a second version of the viewer application.

2. The system of claim 1, wherein the compatibility module comprises a visual control creator to add to the electronic form a visual control associated with the functional feature.

3. The system of claim 2, wherein the visual control associated with the functional feature is a "Submit" button.

4. The system of claim 1, wherein the compatibility module comprises a detector to detect a version of the viewer application used to open the electronic form.

5. The system of claim 1, wherein the compatibility module comprises a detector to:
   detect that the electronic form was opened with the second version of the viewer application; and
   activate the functional feature.

6. The system of claim 1, wherein the compatibility module comprises a detector to:
   detect that the electronic form was opened with the first version of the viewer application; and
   suppress the functional feature.

7. The system of claim 1, wherein the electronic form is in a Portable Document Format (PDF).

8. The system of claim 1, wherein the functional feature is related to a mechanism by which the electronic form can be submitted in response to a workflow request.

9. The system of claim 1, wherein the functional feature is implemented utilizing a Java script.

10. A method to generate adaptive electronic documents, the method comprising:
    receiving a request to generate an electronic form, the electronic form being suitable for viewing with a first version of a viewer application; and
    responding to the request by configuring the electronic form to include a functional feature, the functional feature to be activated in response to detecting that the electronic form is opened with the first version of the viewer application and to be suppressed in response to detecting that the electronic form is opened with a second version of the viewer application.

11. The method of claim 10, comprising adding to the electronic form a visual control associated with the functional feature.

12. The method of claim 11, wherein the visual control associated with the functional feature is a "Submit" button.

13. The method of claim 10, comprising configuring the electronic form to include a detector, the detector being to detect a version of the viewer application used to open the electronic form.

14. The method of claim 10, comprising configuring the electronic form to include a detector, the detector being to:
    detect that the electronic form was opened with the second version of the viewer application; and
    activate the functional feature.

15. The method of claim 14, comprising:
    displaying a visual control associated with the functional feature;
    detecting an event associated with activating of the visual control provided with the electronic form; and
    invoke the functional feature associated with the visual control.

16. The method of claim 10, comprising configuring the electronic form to include a detector, the detector being to:
    detect that the electronic form was opened with the first version of the viewer application; and
    suppress the functional feature.

17. The method of claim 10, wherein the functional feature is related to a mechanism by which the electronic form can be submitted in response to a workflow request.

18. A non-transitory machine-readable storage medium may be provided having instruction data to cause a machine to:
    receive a request to generate an electronic form, the electronic form being suitable for viewing with a first version of a viewer application; and
    respond to the request by configuring the electronic form to include a functional feature, the functional feature to be activated in response to detecting that the electronic form is opened with the first version of the viewer application and to be suppressed in response to detecting that the electronic form is opened with a second version of the viewer application.

* * * * *